United States Patent [19]

Yuasa et al.

[11] Patent Number: 4,518,250
[45] Date of Patent: May 21, 1985

[54] EXPOSURE CONTROL DEVICE FOR A PHOTOGRAPHIC ENLARGER

[75] Inventors: Yoshio Yuasa, Osaka; Nobukazu Kawagoe, Sakai, both of Japan

[73] Assignee: Minolta Camera Kabushiki Kaisha, Osaka, Japan

[21] Appl. No.: 570,175

[22] Filed: Jan. 12, 1984

[30] Foreign Application Priority Data

Jan. 12, 1983 [JP] Japan .................... 58-2834[U]

[51] Int. Cl.³ ............................ G03B 27/70
[52] U.S. Cl. ...................................... 355/69
[58] Field of Search ............... 355/68, 69, 67, 77

[56] References Cited

U.S. PATENT DOCUMENTS

| | | | |
|---|---|---|---|
| 2,460,443 | 2/1949 | Benton | 355/69 |
| 3,989,374 | 11/1976 | Latka et al. | 355/67 X |
| 4,025,190 | 5/1977 | Hughes | 355/68 |
| 4,440,489 | 4/1984 | Yuasa | 355/69 |

FOREIGN PATENT DOCUMENTS 1593438  7/1981  United Kingdom .

OTHER PUBLICATIONS

Article "Photo Timer" on pp. 11-13 of Electronics Today International, Sep. 1975 issue.

*Primary Examiner*—L. T. Hix
*Assistant Examiner*—Douglas S. Lee
*Attorney, Agent, or Firm*—Jackson, Jones & Price

[57] ABSTRACT

An exposure control device for a photographic enlarger includes a printing control means for controlling the exposure of a printing section having a light source. When a printing start means is manually operated, the printing control means actuates the printing section to start the exposure of printing and actuates an attained exposure amount outputting means to measure at each segment of time an amount of exposure attained from the start of printing to that time. A suspending signal for temporarily stopping the exposure and the measurement is generated and fed to the printing control means, when a ratio of the attained exposure to a desired exposure reaches an integer multiple of a fixed ratio of exposures. The exposure of the printing section and the measurement of the attained exposure amount are suspended in response to this suspending signal, and an operator can perform a preparatory operation for the shading and/or burning-in printing process during the suspension.

15 Claims, 4 Drawing Figures

EXPOSURE CONTROL DEVICE FOR A PHOTOGRAPHIC ENLARGER

BACKGROUND OF THE INVENTION

1. Field of the Invention

The present invention relates to an exposure control device which is adapted for use with or in a photographic enlarger or printing device and which controls the exposure of photographic printing. The exposure control device of the present invention is, in particular, useful for printing wherein shading and/or burning-in is required.

2. Description of the Prior Art

In a shading or burning-in process during photographic printing, the ratio of the exposure for the portion to be shaded or burned-in to the exposure for the remaining portion of the picture is determined in accordance with the result of test printings. The actual time of exposure for each portion is calculated based on this ratio. Already available to photographers is a photographic enlarger with a timer that visually displays the exposure time elapsed during the printing process or visually displays the time left until the longest of the exposure times assigned to all the portions of the printing paper expires. With such an enlarger, the user must calculate, from the longest exposure time and the ratio of exposures, the exposure time necessary for the shading or burning-in and execute the shading or burning-in while remembering the calculated exposure time. Simultaneously, the user must measure the time by comparing the displayed elapsed time with the memorized exposure time.

However, in such an enlarger, not only the longest exposure time but also the calculated exposure time must be changed when the diaphragm aperture of the enlarging lens and/or enlarging magnification are changed. Thus, the available device requires complex operations such that the user has to calculate and memorize the exposure time for the shading or burning-in and execute the printing operation every time any enlarging conditions, such as the diaphragm aperture, enlarging magnification, the ratio of exposures, and so on are changed.

SUMMARY OF THE INVENTION

The primary object of the present invention is to provide a photographic enlarger to facilitate the user's printing operation when the above mentioned printing conditions must be changed.

Another object of the present invention is to provide an exposure control device for a photographic enlarger which does not require the user to calculate the amount of exposure for the portion to be shaded or burned-in even when the printing conditions are changed.

According to the present invention, in view of the fact that the ratio of the exposure for the portion to be shaded or burned-in to the exposure for the remaining portion is constant even when the diaphragm aperture and/or enlarging magnification are changed, the exposure operation is suspended when the amount of exposure accumulated during the proceeding of the printing reaches a value commensurate with the ratio. Accordingly, at the time the exposure is suspended, the user may change the printing conditions and carry out the shading or burning-in. Thus, an exposure control device of the present invention dispenses with a complex printing operation wherein the amount of exposure for the portion to be shaded or burned-in must be calculated for every change. In short, the printing operation is simplified. Furthermore, the present invention is advantageous in that the user can know the attainment of a given amount of exposure from the disappearance of the projected image as he or she concentrates his or her attention on the image.

The above and other objects and features of the invention will become more clear with the following description and the accompanying drawing wherein one example is illustrated.

DETAILED DESCRIPTION OF THE PREFERRED EMBODIMENT

Figure 1:
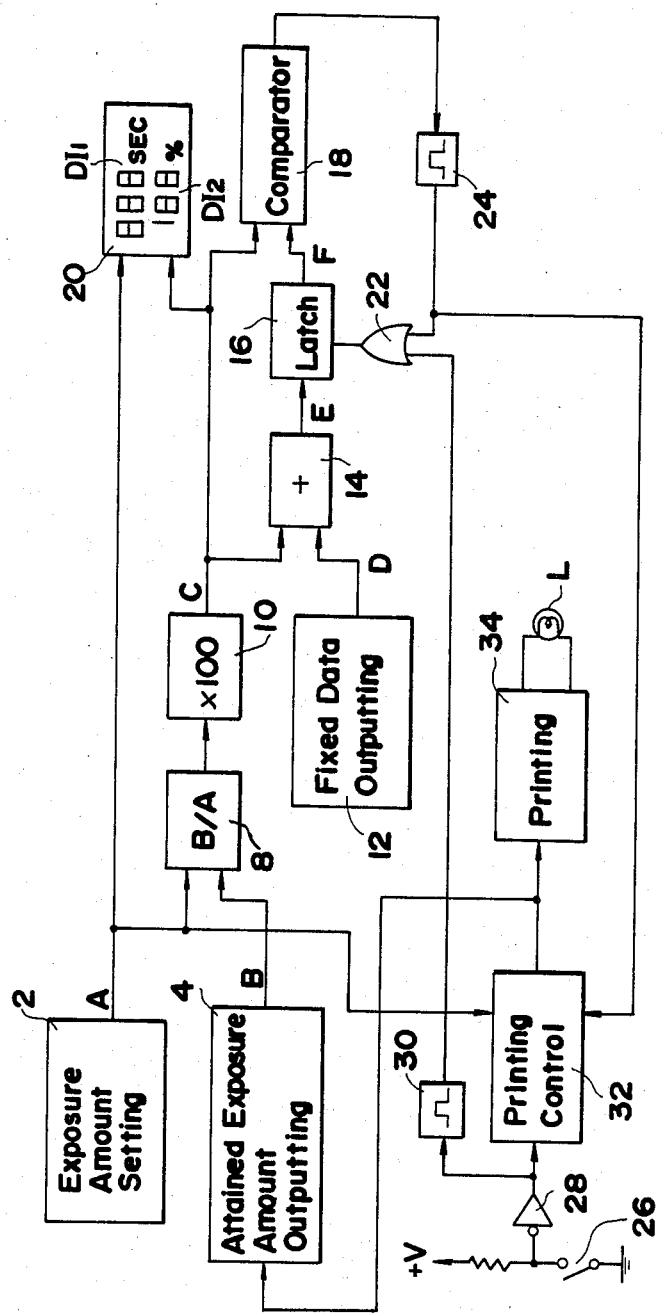
FIG. 1 is a block diagram showing the circuit arrangement of the embodiment of the present invention.

With reference to FIG. 1, a value A commensurate with the maximum of the exposure amount required for respective portions of an image to be printed is set, e.g., a value of the maximum exposure time, is set beforehand in an exposure amount setting section 2. A printing control circuit 32 starts its operation when the printing start switch 26 closes, and controls the operation of a printing section 34 and an attained exposure amount data outputting section 4. The printing section 34 includes a flat light source, such as a lamp L, the produces a constant intensity of light irrespective of time passage. The printing section 34 effects the exposure for printing under the control of the control circuit 32. The attained exposure data outputting section 4 momentarily produces a value B which is commensurate with the amount of the exposure attained from the start to the portion of the printed image requiring the maximum amount of exposure is reached, e.g., the value of the exposure time that has elapsed from the start of the printing. A calculator section includes a divider 8 and a multiplier 10. The divider 8 calculates the ratio of the value B given by the attained exposure amount data outputting section 4 and the value A set in the exposure amount setting section 2, i.e., B/A. The multiplier 10 multiplies the ratio B/A by 100, and generates a data representing the value C=(B/A)×100. An indicator section 20 includes a first indicating area DI1 for displaying in digital form the value A and a second indicating area DI2 for indicating in digital form the value C that changes from 0 to 100 as the printing operations proceeds. The displaying of the values A and C are not restricted to a digital format. For example, the value C may be indicated in an analog form by a ten dot-shaped or line-shaped light emitting elements arranged in a line and selectively energized so that the number of the elements being energized in increased by one as the value C increases by 10.

A fixed data outputting circuit 12 produces data for temporarily stopping the exposure at each moment when the amount of exposure given to the portion of the image requiring the maximum amount of exposure has increased by a given percentage. The data may have a fixed value corresponding to 10% or a value corresponding to a percentage arbitrarily determined by the user. A latch circuit 16 responds to the rising of a pulse supplied from an OR gate 22 and latches the data generated from the adder at the time of the rising of the pulse. This latched data in the latch circuit 16 corresponds to the target or reference value for the temporary stopping of the exposure. A comparator 18 inverts its output to a "High" level when the percentage data fed from multiplier 10 reaches the target value of the data latched in the latch circuit 16. A one-shot circuit 24 generates a pulse of a given duration in response to the inversion of the output of the comparator 18. The pulse is transmitted through the OR gate 22 to the latch circuit 16, which in turn latches the data of a new target value. At the same time, the pulse is fed to the control circuit 32 to suspend, for the period of the pulse duration, the exposure by means of the printing section 34 and also the measuring or counting of the elapsed exposure time by means of the attained exposure amount data outputting section 4.

Now, let's assume that a value of the maximum exposure time and the value of the ratio of the exposure have been obtained from test printings. If the value T1 of the maximum exposure time is set in the exposure amount setting section 2, the maximum exposure time value is displayed, for example, in seconds, at the display area DI1 of the indicating section 10. In addition, the percentage value N which is commensurate with the ratio of the exposure may be set in the fixed data outputting circuit 12. Then, if the printing start switch 26 is closed, the control circuit 32 actuates the printing section 34 to start the printing operation. At the same time, the control circuit 32 actuates the attained exposure amount data outputting section 4 to start its time measurement or counting. The closure of the switch 26 also causes the one-shot circuit 30 to generate a pulse such that the latch circuit 16 latches the data generated from the adder 14 at the time of the pulse generation, i.e., the data of 0+N. The attained exposure amount data outputting circuit 4 continuously supplies to the divider 8 the measured time data T2. Accordingly, the value (T2/T1)×100 obtained through the divider 8 and the multiplier 10 of the calculating section, i.e., the ratio of the elapsed exposure time to the maximum exposure time, increases with the lapse of time. The value is successively displayed by percentage at the display area DI2 of the indicating section 20.

When the data C supplied from the multiplier 10 reaches N, the output of the comparator 18 inverts to a "High" level and the one-shot circuit 24 generates a pulse of a given duration which causes the latch circuit 16 to latch the data of N+N=2N and stops the printing operation and the time counting for the period of the pulse duration. While the printing is suspended, the user may cover or uncover the portion of the printed image to be shaded or burned-in for a desired printing control. When it is required to change the diaphragm aperture and/or the enlarging magnification, the maximum exposure time T1 may also be changed.

When the output of the one-shot circuit 24 turns to a "Low" level after the elapse of the given time period, the control circuit 32 restarts the exposuring operation and the time counting. When the output data C of the multiplier 10 reaches 2N, the one-shot circuit 24 again generates a pulse of the given duration to suspend the exposure and the time counting, and the latch circuit 26 latches the data of 2N+N=3N. Then, the exposure and the time counting are restarted after the elapse of the given time. In the same manner, the suspending and restarting of the exposure operation and time counting are repeated. If the fixed data generating circuit 12 generates a fixed data of 10%, the exposure is suspended for a given period at each time 10% interval such as at 10%, 20%, 30%, ..., 90%. When the maximum exposure time T1 has expired with the value displayed reaching 100%, the control circuit 32 stops its operation and the exposure is completed.

Figure 2:
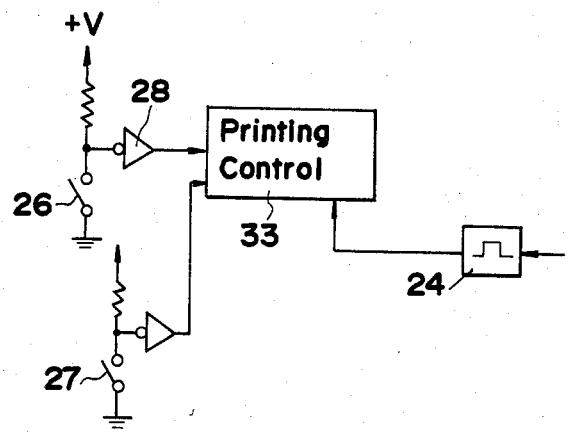
FIG. 2 is another embodiment of the circuit of a printing control means in FIG. 1.

Although the above embodiment is arranged such that the operations of exposure and time counting are automatically restarted after a suspension of a given period, the embodiment may be modified to restart the exposure and time counting operation in response to a manual operation. To this end, the control circuit 32, for example, may be modified to generate an exposure restart signal in response to the closing of the switch 26 or an alternate switch 27 (FIG. 2) additionally provided for the restarting such that the exposure and time counting are restarted when the user closes the switch 26 or the additional switch 27.

Figure 3:
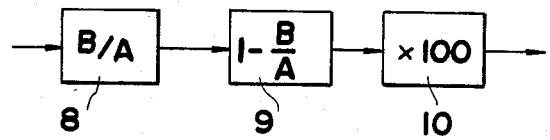
FIG. 3 is another embodiment of the circuit of a calculator in FIG. 1.

Additionally, the data for the indication and judgement of the elapsed exposure time may be a percentage data of the remaining amount of exposure $(1-B/A)\times 100\%$ calculated by subtracter 9 (FIG. 3) and multiplier 10 instead of the attained exposure amount data employed in the above embodiment.

Figure 4:
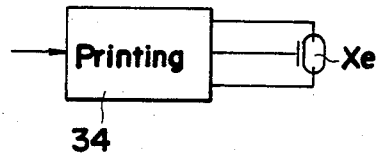
FIG. 4 is another embodiment of the circuit of a printing means in FIG. 1.

Furthermore, although the above embodiment adopted a flat light source, such as a lamp that produces a constant intensity of light irrespective of the time passage and whose exposure time is used for representing the amount of exposure, the light source may be, instead, a pulse light source such as a Xenon tube Xe (FIG. 4) which generates light with its intensity changing with time. In such a case, the attained amount of exposure may be measured by an integration of the measurement of the light emitted from the tube.

As many apparently widely different embodiments of this invention may be made without departing from the spirit and scope thereof, it is to be understood that the invention is not limited to the specific embodiments thereof except as defined in the appended claims.

What we claim is:

1. An improved exposure control device for printing photographic prints comprising:
   means for setting a predetermined exposure amount to output a signal corresponding to said exposure amount;
   means for activating the exposure printing;
   means for measuring the accumulated exposure from the start of the printing operation and providing a current exposure signal;
   means for calculating a relationship between the predetermined exposure amount signal and the current exposure signal, and
   means for periodically suspending the exposure printing in response to predetermined calculated relationships whereby a user can alter the contrast of the print prior to the continuance of the printing process.

2. The invention of claim 1 wherein the means for periodically suspending the exposure printing deactivates the means for activating the exposure printing for a set period of time and then automatically permits the exposure printing to continue.

3. The invention of claim 2 wherein display means is provided to display to the user the predetermined exposure amount and a relationship calculated between the predetermined exposure amount signal and the current exposure signal.

4. The invention of claim 3 wherein the means for calculating a relationship provides a ratio of the predetermined exposure amount signal and the current exposure signal.

5. An exposure control device for a photographic enlarger having a light source for the exposure during photographic printing, said device comprising:
   an exposure amount setting means for setting therein first data of a desired exposure amount for the photographic printing;
   a printing start means operable for starting a photographic printing operation;
   an attained exposure amount outputting means for continually outputting second data which represents the amount of exposure attained from the start of printing to the current time;
   a calculator for calculating a ratio of said first and second data and generating third data which represents the ratio;
   a fixed data outputting means for outputting fourth data which represents a ratio of exposures;
   a comparator for comparing said third and fourth data and generating a suspending signal when said third data reaches an integer multiple of said fourth data; and
   a printing control means responsive to said suspending signal for suspending the operations of said light source and said attained exposure amount outputting means for a given period.

6. The device according to claim 1, wherein said light source includes a flat light source that produces a constant intensity of light irrespective of time passage, said exposure amount setting means includes a means for outputting data of an exposure time which commensurate with said desired exposure amount, and said attained exposure amount outputting means includes a counter that counts a time elapsed from the start of printing and outputs the counted time.

7. The device according to claim 1, wherein said light source includes a pulse light source that produces pulse light periodically with its intensity changing with time, and said attained exposure amount outputting means includes an integrator that integrates the light intensity emitted from said pulse light source.

8. The device according to claim 1, further including a display means for displaying said third data fed from said calculator.

9. The device according to claim 1, wherein said calculator further includes a subtracter for subtracting said ratio of said first and second data from a unitary value of one and generating fifth data which represents the result of the subtraction, and said device further including a display means for displaying said fifth data fed from said subtracter.

10. The device according to claim 1, wherein said comparator generates the suspending signal during a given period, and said printing control means is formed to suspend the operations of said light source and said attained exposure amount outputting means during the existence of said suspending signal and to restart the operations of said light source and said attained exposure amount outputting means in response to the expiration of said suspending signal.

11. The device according to claim 10, wherein said given time period of said suspending signal is determined such that an operator can accomplish a preparation for shading and/or a burning-in printing process during that time period.

12. The device according to claim 1, wherein said printing control means further includes a printing restart means manually operable for restarting the operations of said light source and said attained exposure amount outputting means.

13. A method for controlling the exposure of printing for a photographer enlarger, said method comprising:
   setting a desired exposure amount for photographic printing and a first ratio related to the exposure for the portion to be shaded and/or burned-in to said desired exposure;
   starting the exposure for the printing by measuring the amount of exposure attained from the start of printing;
   calculating a second ratio of second attained exposure to said desired exposure;
   generating a suspending signal for a desired period of time at every occasion when the second ratio reaches a sequential integer that is a multiple of the first ratio; and
   suspending the exposure and the measurement to enable a preparatory operation for the shading and/or burning-in by an operator during the generation of said suspending signal.

14. The method according to claim 13 further comprising:
   test-printing an image to be printed; and
   determining said desired exposure amount and said first ratio of the exposures in accordance with a result of the test printing.

15. The method according to claim 14 further comprising:
   determining, as said desired exposure amount, the maximum of the exposure amount required for respective portions of an image to be printed.

* * * * *